MODULAR FLOATING WATER-COOLING SYSTEM
Original Filed May 21, 1970 4 Sheets-Sheet 1
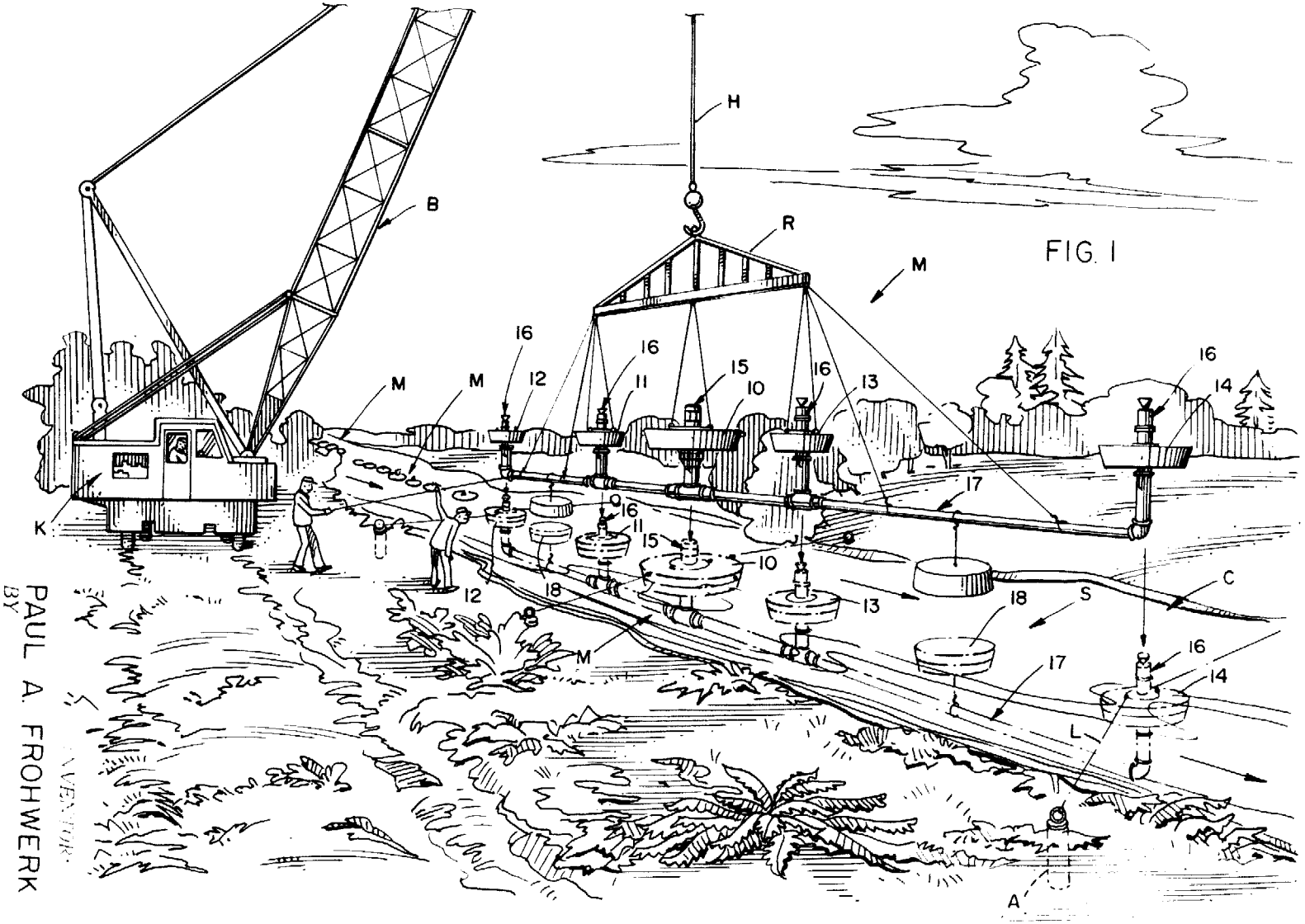
INVENTOR
PAUL A. FROHWERK
BY
Dawson, Wilson, Fallon & Lungmus
ATT'YS

MODULAR FLOATING WATER-COOLING SYSTEM

Original Filed May 21, 1970 4 Sheets-Sheet 2

INVENTOR:
PAUL A. FROHWERK
BY
Dawson, Tilton, Fallon & Lungmus
ATT'YS

MODULAR FLOATING WATER-COOLING SYSTEM

Original Filed May 21, 1970 4 Sheets-Sheet 3

INVENTOR:
PAUL A. FROHWERK
BY
Dawson, Tilton, Tilton & Longmuir
ATT'YS

MODULAR FLOATING WATER-COOLING SYSTEM

Original Filed May 21, 1970 4 Sheets-Sheet 4

INVENTOR:
PAUL A. FROHWERK
BY
Dawson, Tilton, Fallon & Lungmus
ATT'YS

United States Patent Office

Re. 27,853
Reissued Dec. 25, 1973

27,853

MODULAR FLOATING WATER-COOLING SYSTEM

Paul A. Frohwerk, Fort Worth, Tex., assignor to Ceramic Cooling Tower Company, Fort Worth, Tex.

Original No. 3,622,074, dated Nov. 23, 1971, Ser. No. 39,351, May 21, 1970, which is a continuation-in-part of Ser. No. 7,901, Feb. 2, 1970. Application for reissue Feb. 23, 1972, Ser. No. 228,664
Int. Cl. B05b *17/08*
U.S. Cl. 239—11 37 Claims

Matter enclosed in heavy brackets [ ] appears in the original patent but forms no part of this reissue specification; matter printed in italics indicates the additions made by reissue.

ABSTRACT OF THE DISCLOSURE

An evaporative water-cooling system and method for reducing the temperature of heated water in an open flow channel utilizes a plurality of water pump and spray units or modules floating in the channel and anchored at sequential locations therealong. In a preferred embodiment, the modules are identical in design, and each include at least three separate floats, a power-operated water pump supported by one of the floats, at least two sprays supported by others of the floats, and pipes connecting the pump to the sprays. Within each module, the floats are preferably aligned in the direction of flow, the pump float being centered with spray floats upstream and downstream, and the pump intake being located beneath and protected by the overhang of its disk-shaped float. The sprays project water upwardly into the atmosphere for evaporative cooling and return to the channel. The standardized modules can be patterned in flow-direction sequences and cross-channel clusters, providing a predeterminable temperature reduction profile under specified design conditions. The system is adapted for both once-through and closed-loop channels. As water flow rate, channel volume and/or temperature reduction requirements change, the pattern can be altered accordingly, by either down or cross-channel module modifications.

CROSS-REFERENCE

This application is a continuation-in-part of my copending application Ser. No. 7,901, filed Feb. 2, 1970, entitled "Powered Spray Module System," and now abandoned. The benefit of the filing date of said prior application is claimed for the subject matter of this application to the extent that said subject matter is common.

BACKGROUND AND SUMMARY

It is common practice for heated water produced in large volumes by power generating, industrial, and other plants (viz heat exchange cooling water) to be subjected to evaporative cooling. Basically, three cooling systems are in general use: (1) cooling towers, (2) fixed pipe spray ponds, and (3) lakes and ponds. Cooling towers are effective but are expensive to install, and are of substantially fixed capacity. Wooden mechanical draft cooling towers, the most common type, inherently involve high maintenance expense. In spray ponds, the piping, sprays, and pumps are permanently installed at fixed locations within a relatively large essentially static body of water or "pond." Usually the bottoms and sides of the pond are formed of concrete.

Heretofore, where the required volume of cooling water is very large, a closed loop recirculation system with expensive cooling towers may be required. Alternatively, where the plant can be located on or near a natural body of water, this permits the incoming water to be drawn directly from the river, lake, etc. After the water has been heated in the plant operation, it is usually discharged through a surface channel back to the river or lake. With this once-through type of system, excessive heating of the body of water can result, which may raise the temperature of the water supplied to the plant, and is undesirable for the fish and plant life in the body of water. Although such "thermal pollution" is a recognized problem, prior to the present invention no satisfactory equipment from the standpoints of cost and effectiveness has been available for reducing the temperature of large volumes of industrial cooling water removed from and returned in heated condition to natural bodies of water. The problem is particularly acute for nuclear power plants using once-through cooling system drawing from and returning cooling water to natural bodies of water.

This invention is based in part on the novel concept of floating pump and spray units employed in a sequential arrangement in an open air water flow channel. The system is highly flexible, can be installed at moderate cost, and involves little maintenance expense. For example, the system is adapted for immediate use in existing once-through hot water plant discharge channels, the pump and spray units being installed without alteration of the channel by floating them at anchored positions between the upstream discharge from the industrial plant and the downstream discharge of the lake, river, etc. The system is also adapted to a closed circuit arrangement where the water from the plant is discharged into a loop-type channel. With sequential cooling by the floating units positioned in the channel loop, cooled water can be removed continuously from the return end of the loop for reuse in the plant. The system of this invention meets an extremely wide range of industrial water cooling requirements. Water flow rates in excess of one million gallons per minute can be handled to produce a reduction in water temperature of 20° to 25° F. with as low as a 5° F. approach to the ambient wet bulb temperature. The desired cooling effect is created by a direct air-water contact condition which causes mass and heat transfer from water to air. The standardized spray nozzles develop a thermally efficient uniform water spray pattern, which results in the evaporation of a small portion of the circulating water along with sensible heat transfer. For typical applications, each spray of a multispray module, depending on location in the sequence, can reduce the temperature of the initial hot water circulated through the nozzle, from 2° to 20° F. The modules located in series along the stream dissipate the heat load progressively until the temperature of the circulated water has been reduced to the required condition. The standardized modules can be patterned in flow-direct sequences and cross-channel clusters, providing a predeterminable temperature reduction profile under specified design conditions.

For minimizing equipment and installation costs while at the same time optimizing cooling efficiency, certain design features have been found to be highly advantageous. The modular system permits the modules to be assembled on the banks of the channel, advantageously at a central location, thereby eliminating the necessity of assembly of components either in the stream or under water. Further, the components of the modules can be standardized for manufacturing, shipped in separated or disassembled condition, and readily assembled at the job site by workmen of ordinary skill.

It has been found desirable to have the same number of spray units on each side of the pump unit, the water being distributed from the pump through a T-connection. Advantageously, the nozzle spacing and spray patterns are as uniform as practical and the spray patterns with reference to still air conditions are contiguous but essentially non-overlapping. When such a module is arranged transverse of the direction of stream flow, the central pump unit tends to draw water from the center area of the stream, permitting water flowing in the outer portions of the stream to "channel" past the pump intake. Preferably, therefore, the modules have the spray and pump units aligned with the direction of stream flow. As the width of the stream increases, the modules are used side by side in parallel clusters, the sprays of adjacent modules being transversely spaced to avoid substantial overlapping of the sprayed water. This permits the modules to be successfully adapted to streams of virtually any given width, enough modules being used in each cluster to provide complete transverse coverage, and the cluters being repeated sequentially down the stream as far as the length of the channel will permit, or until the desired cooling capacity is obtained. By clustering the modules transversely, and using repeated sequences of the clusters, the stream can be treated as in effect a series of separate parallel channels for purpose of calculating the number of modules and clusters of modules to achieve the desired minimum temperature reduction of the stream under specified or typical design atmospheric conditions.

By employing diameter "wafer" or disk-shaped floats for supporting the pumps, sprays, and connecting piping, additional advantages are achieved. With contiguous spray patterns, a considerable portion of the sprayed water will fall on top of the floats, which thereby tends to block direct recirculation of the cooled water. This is especially important for the pump unit, which is ordinarily the largest diameter of the floats, the pump being the heaviest of the units to be supported. The pump float is therefore highly effective in blocking direct recirculation of cooled water where the sump intake is located below the central portion of the disk-shaped pump float. The pump thereby tends to draw its intake water from the relatively hotter subsurface water of the stream, and there is little tendency for direct recirculation of the sprayed water, although the units of the module are spaced closely enough together so that a large volume of the sprayed water falls on top of the pump float. This design feature is particularly advantageous when used in a module of balanced spray unit design, having an equal number of spray units upstream as downstream with respect to the pump unit, and where the module is used with the units thereof aligned with the direction of stream flow.

Further design features, advantages, and results will be set out in the following detailed specification.

THE DRAWINGS

This invention is shown in illustrative embodiments, in the accompanying drawings, wherein:

FIG. 1 is a perspective view illustrating a modular floating water cooling system constructed in accordance with the present invention being installed in a water flow channel;

DETAILED DESCRIPTION

Figure 2A:
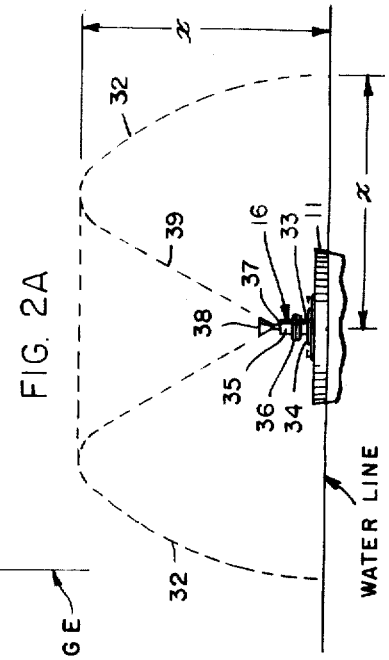
FIG. 2A is an enlarged partial view of one of the spray units, the spray pattern being illustrated diagrammatically.

The modular floating water cooling system and method of this invention is especially designed for reducing the temperature of heated water discharged from a plant source of heated water into a channel-providing means extending along the surface of the ground in open contact with the atmosphere. In a typical operation, the water flows through the channel as a continuous stream either to a downstream point of discharge in a once-through channel, or to a plant return end in a closed-loop channel. The system can be employed advantageously with channels of varying width, and no special preparation of the sides or bottom of the channel are required, that is, the channel does not need to be lined. Existing channels, or small lakes or ponds can also be utilized, especially where inlets exist, or can be arranged, to produce a confined flowing stream, within which the modular units of the present invention can be positioned in a sequential arrangement.

In one method of practicing the present invention, a plurality of identical water spray modules are floated in the moving stream and anchored at sequential locations along the banks of the stream or channel. As will subsequently be explained, the modules can be arranged in individual sequences or in sequences of clusters.

In one preferred embodiment, each of the modules will include at least three separate float means. A power-operated water pump is mounted on and supported by one of the floats. In addition, two water sprays are mounted on and supported by at least two others of the floats. Pipes or conduits are provided extending from and connecting the discharge of the pump to each of the sprays. The pump is provided with a water intake in communication with the flowing water of the stream, and also with an outlet arranged to direct water under pressure into the distribution pipes for supply to the sprays. The sprays are constructed and arranged to be operative to project sprays of water upwardly into the atmosphere above the stream for cooling of the sprayed water, the water in the sprays being subjected to evaporate cooling and contact with the atmosphere, and the resulting cooled water falling back on the surface of the stream and being returned thereto.

As will subsequently be further explained, the arrangement of the sprays relative to the pump within each module can be of importance. To limit recirculation of the sprayed and cooled water through the pump of a particular module, it is desirable to have at least one and preferably two or more of the sprays positioned downstream of the pump means. The sprayed water falling back onto the surface of the stream then moves downstream with the flowing current rather than back into the pump intake.

In two particularly advantageous embodiments, each of the modules contains either four or six sprays, one float being provided for each spray, and a separate float for the pump unit, While all of the spray units can be located downstream of the pump unit, the design can be optimized by having the outlet pipe from the pump discharge provided with a T-fitting and an equal volume of water directed upstream to the two (or three) of the spray units, and downstream to the other two (or three) spray units. While it might be assumed that this would result in considerable recirculation of water from the upstream sprays, it has been found that the extent of recirculation can be reduced by employing "wafer" or disk-shaped floats with the pump and spray units located centrally thereon. In particular, the pump float, which will normally be largest in diameter or cross-sectional area, can provide an effective shield or baffle for the portion of the sprayed water which falls thereon. Although the spacing and spray patterns of the adjacent sprays are such that the sprayed water overlaps the pump float, the pump intake can be protected by locating it beneath the central portion of the pump float. The disk-shaped float will project outwardly beyond the pump intake to provide a shielding overhang therefore. With this arrangement, the pump will tend to draw its intake water from the hotter subsurface portions of the stream without appreciable immediate recirculation of the sprayed and cooled water.

Looking now at FIG. 1 of the drawing, there is shown an elongated water flow channel C within which a stream S is flowing from left to right as indicated by the arrows. The upstream end of the channel (not shown) receives heated water from a plant source, such as a power generating plant, and the downstream end of the channel (not shown) can discharge into an adjacent body of water, such as a lake, river, bay, etc., or a closed-loop arrangement can be used with the channel doubling back to the plant.

The spray modules M are shown being installed. Upstream, two modules M can be seen which have already been floated in the stream, and anchored at fixed locations by suitable mooring lines L attached to anchors A. In the foreground of the picture, there is shown a crane K having a boom B to which is attached a hoist line H that supports a lift ring R lowering one of the modules M into position in the stream. For assembly line installation, the module can be assembled at a central location on the channel banks, launched, and floated down or upstream to their permanent anchorage.

In FIG. 1, a balanced module is shown including a central or middle pump float 10, upstream spray floats 11, 12, and downstream spray floats 13, 14. The pump unit is indicated generally at 15, and the spray units by the number 16. The main and branch pipes connecting the pump unit with the spray units are indicated in total by the number 17. With equal spacing of the spray units, there is a greater free length of pipe between the spray units remote from the pump units, namely, between floats 11 and 12 and 13 and 14. As shown, additional support floats 18 can be procided connected by suitable cables to the pipe sections between the floats.

Figure 2B:
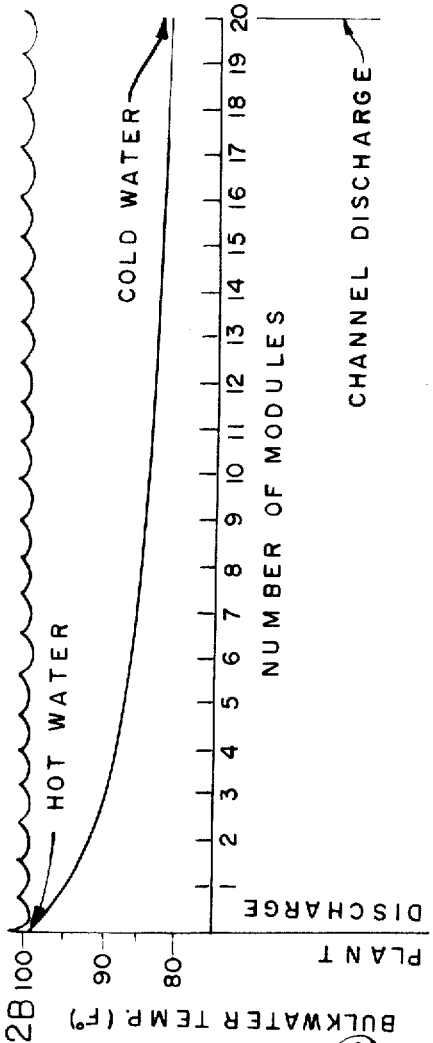
FIG. 2B is a graphical representation of the type of thermoprofile achieved by the system.
Figure 2:
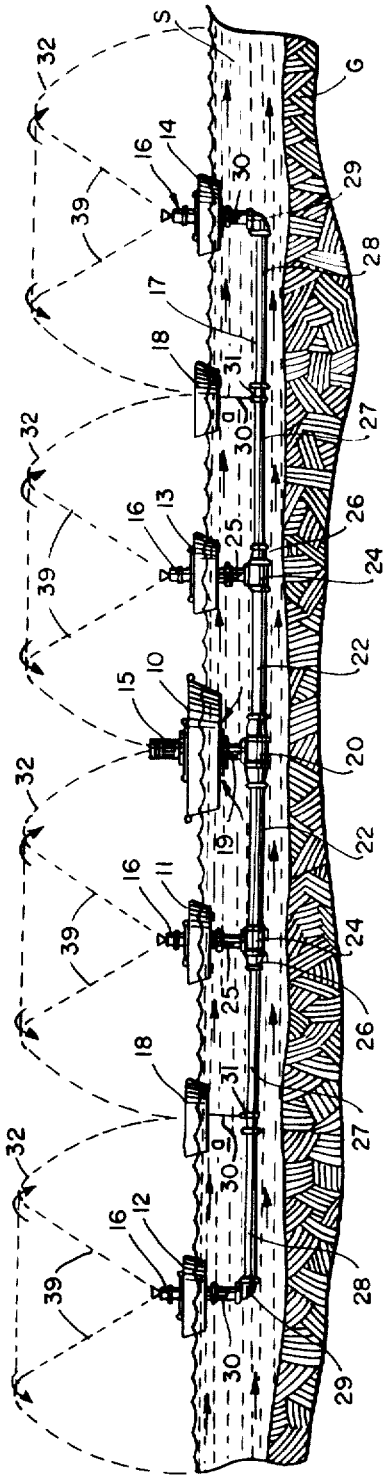
FIG. 2 is an elevational view showing one of the modules installed in the flow channel.

In FIG. 2, the assembly of the module M of FIG. 1 is shown in greater detail. The pump unit 15 discharges into the vertical pipe section 19, which connects to the T-fitting 20. Water under pressure flows upstream and downstream through the horizontal pipe sections 22, and is distributed through T-fittings 24 to the vertical pipe sections 25 that connect to the sprays 16, respectively, on the floats 11 and 13. To maintain uniform pressure at the sprays, water to the upstream and downstream floats 12 and 14 is supplied through reducer fittings 26 and connected pipe sections 27, 28 of smaller diameter than pipe sections 22. Elbows 29 connect to the vertical pipe sections 30 and respectively supply the water under pressure to the spray 16 of float 12 and spray 16 of float 14. Pipe sections 30 can be of smaller diameter than pipe sections 25 where required to provide uniform pressure at the sprays. The intermediate support floats 18 are shown connecte by cables 30a to attachment rings or loops 31.

In FIG. 2, the stream S is shown flowing from left to right, corresponding with FIG. 1, and the bottom of the channel is indicated by the ground G. The irregularity of the bottom does not present any problem, since the pipe means 17 is supported by the floats above and out of contact with the bottom. In a typical embodiment, the stream would have a depth of at least 7 feet, and the distance from the water float line to the underside of the pipe means 17 would be about 6 feet.

In practicing the method and utilizing the modular system of this invention, it is desirable to employ sprays which produce predetermined spray patterns. For example, spray patterns can be utilized having fan-shaped cross sections. The dotted lines 32 in FIG. 2 indicate an approximate outer shape for the sprays being generated by the nozzle means 16, the sprays being symmetrical on all cross sections. It will be understood that the shape is determined in still air conditions, since wind will distort the patterns to a greater or lesser extent depending upon the direction and velocity of the wind.

In FIG. 2A, one of the nozzle means 16, as supported on the float 11, is shown in greater detail. A vertical pipe section 33 extends upwardly above the top of the float 11, being mounted on a plate 34, the nozzle pipe 35 is connected thereto by suitable flange fittings 36. The nozzle pipe 35 terminates in an outlet 37 which projects water upwardly against the underside of a conical diffuser or baffle 38. The water discharging vertically from the nozzle assembly will be deflected outwardly in a generally fan-shaped or conical pattern, as indicated by the dotted lines 39. Other nozzles can be used to create spray patterns of predetermined configuration, such as patterns of square cross section.

By utilizing standard substantially identical nozzles, and supplying the water at approximately the same pressures and flow rates to each nozzle, the same spray pattern can be produced from nozzle to nozzle along the modules. While the cone baffle 38 can be made vertically adjustable, this is not required. In the preferred embodiments, the spray patterns produced by the nozzle with reference to still air conditions should have approximately the same diameters (or cross sections), heights, and spray volumes. In FIG. 2A, the maximum diameter at the base of the spray (the waterline) as indicated by the letter B, and the maximum height is measured on a vertical line passing through the center of the nozzle as indicated by the letter H.

As shown in FIG. 2, for economy of spacing, the spray patterns 32 can be arranged contiguously but not substantially overlapping. Overlapping of the sprays can reduce the evaporative cooling efficiency. Of course, some overlapping and spray drift is inevitable, and must be accepted, at least under unfavorable wind conditions.

In one preferred embodiment, the nozzles are spaced from 30 to 50 feet apart, a typical spacing being 40 feet. Correspondingly, the spray pattern will have a diameter D approximately equal to the spacing between the centerlines of adjacent nozzles, for example, a spacing of 40 feet. Utilizing this spacing, the overall length of the module of FIG. 2 would be 120 feet, the spray nozzles 16 being spaced 40 feet apart and the spray patterns having base diameters of approximately 40 feet. Since the pipe means 17 is preferably formed of rigid material, such as cast iron pipes and pipe fittings, the pipe means is effective to maintain the desired spacing between the sprays. While flexible piping and connections can be utilized, it will therefore be understood that the use of rigid pipes and rigid connections to the floats is preferred.

Figure 4:
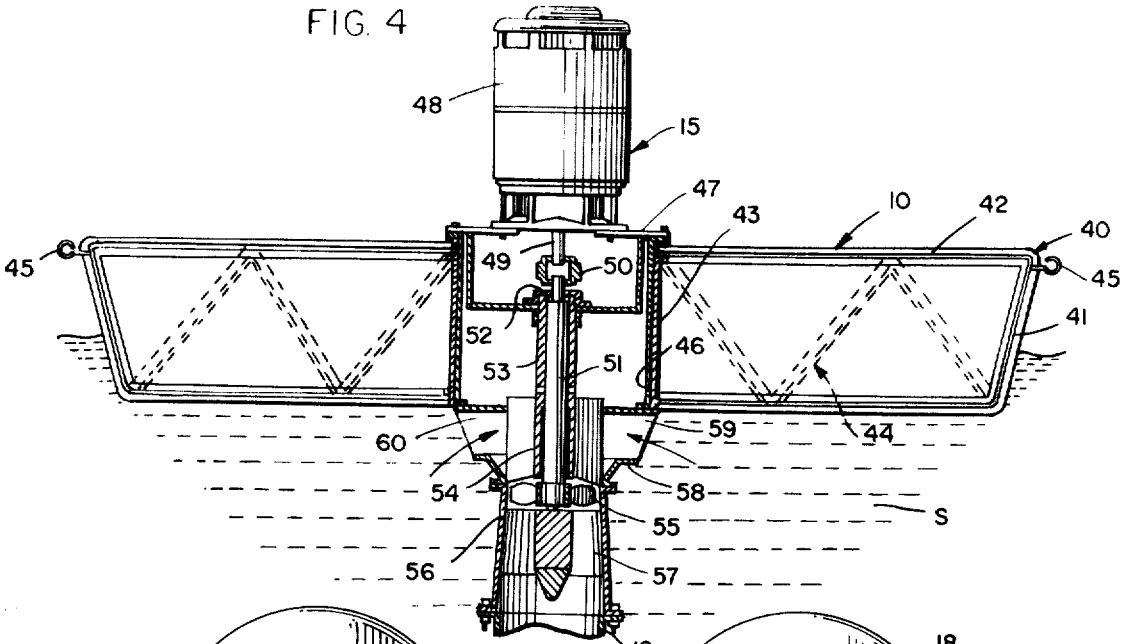
FIG. 4 is an enlarged elevational view of one of the pump float units, certain of the pump components being shown in section.

In FIG. 4, the pump float 10 is shown in greater detail, as is the pump unit 15. The float 10 is disk-shaped. The float can be fabricated in various ways. One advantageous procedure is to form a doughnut-type shell 40 including a hollow bottom portion 41 and a lid portion 42. A tubular center portion 43 can be connected to the base 41 and the lid 10 by watertight seals, and the lid also sealed to the base at its outer periphery. To provide additional strength within the interior of case 40 there can be provided a series of radically extending brace or truss assemblies 44. While the interior of case 40 can be left open, it is preferred to fill it with a plastic foam material, which will guarantee the floatability of the unit even if a leak develops in the case 40. In practice, it has been found desirable to form the case 40 of a polyester plastic reinforced with glass fibers. The foam material, which can be formed in situ if desired, can be a rigid polyurethane foam.

To provide for cable connections during installation and mooring, suitable mooring ties 45 can be provided at 90° angles around the periphery of the float, the eyes being secured to the outer ends of the truss members 44. Within the hollow center portion of the float, a motor and pump unit can be mounted.

In the illustration given, a tubular housing 46 extends through the float ring 43 and supports a platform 47 on which is mounted a motor 48. Motor 48 can be an electric motor, power being supplied thereto by means of an electric cable extending from the shore to the float. For example, the cable can be carried on one of the mooring lines which is connected to one of the eyes 45. Alternatively, an internal combustion engine can be substituted for the electric motor, and the float provided with a fuel tank, and/or a fuel supply line installed to extend from the shore to the pump float.

Motor 48 drives a shaft 49 which connects through a flexible coupling 50 to a propeller shaft 51. A thrust and radial sealed bearing is provided at 52. Drive shaft 51 is contained within a sleeve 53 and supports the shaft 51 through a water lubricated radical bearing 54. A heavy duty cast propeller is provided at 55, being driven by the shaft 51, and coacting with the pump housing 56. Immediately below 55, the straightening vane assembly can be provided as indicated at 57. Immediately above the propeller 55 is a housing 58 which provides oppositely disposed water intakes 59 and 60. The water from the subsurface levels of the stream S enters the intakes 59, 60 and moved under pressure by the impeller into the vertical pipe section 19, which connects with the T-fitting 20, as shown more clearly in FIG. 2. In typical embodiments, the pump can have a capacity of 500 to 15,000 gallons per minute.

It has been found to be highly advantageous to locate the pump intake below the central portion of the pump float 10, as shown in FIG. 4. By utilizing a disk-shaped float which projects outwardly beyond the intakes 59, 60 the pump tends to draw its intake water from the hotter subsurface portions of the stream. The portion of the sprayed water which falls on the top of the float 10, as indicated in FIG. 2, is deflected or baffled away from the pump intake. This tends to prevent immediate recirculation of the sprayed water. Consequently, the pump will draw from the hotter subsurface water without appreciable immediate recirculation of the cooler surface water.

It will be appreciated that the size and diameter of the pump floats can vary. In general, however, it has been found desirable to utilize disk-shaped pump floats, such as the float 10, which have diameters of from 8 to 20 feet. Typical heights or thickness of the pump floats are in the range of about 1 to 3 feet. Having the intakes 59, 60, immediately beneath the bottom of the float 10, a tubular cover or extension can be provided around the intakes, being secured to the bottom of the float 10, and made to extend downwardly to a selected depth.

Figure 5:
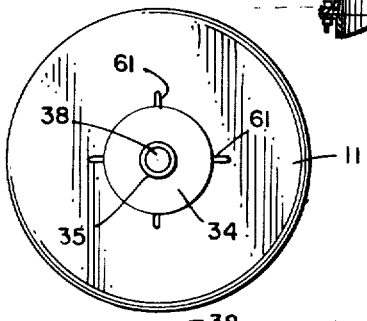
FIG. 5 is a plan view of one of the spray units.
Figure 6:
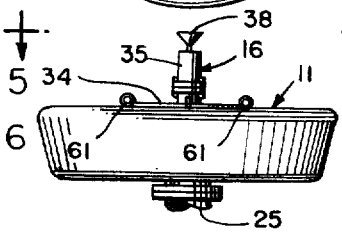
FIG. 6 is an elevational view of one of the spray units.

FIGS. 5 and 6 show further constructional details of a typical spray float, such as the float 11. Most of the components have already been described in connection with FIG. 2A. The support plate 34 which sets on top of the float 11 is provided with 90° mooring eyes 61, which can be used for attachment of cables in installing and anchoring the module. The float 11 can be fabricated in the same manner as the float 10, being formed with a doughnut-type case, including internal bracing, and filled with plastic foam. The desirable materials of construction are the same as those for float 10.

Figure 9:
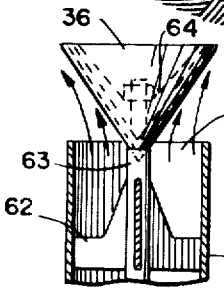
FIG. 9 is an enlarged fragmentary sectional view of one of the spray heads.

In FIG. 9, the nozzle is shown in greater detail. Within the upper end of the nozzle pipe 35 there is a spider support 62, which supports a rod 63 having a reduced upper end extending through the base of the cone baffle 36. The upper end of the rod 63 can be threaded and provided with a nut 64 for holding the cone in place. When the design of the nozzles has been standardized, it will usually not be necesary to provide for adjustability, and therefore the form of FIG. 9 illustrates a fixed relation between the underside of the cone 36 and the outlet 37 of the nozzle.

Figure 7:
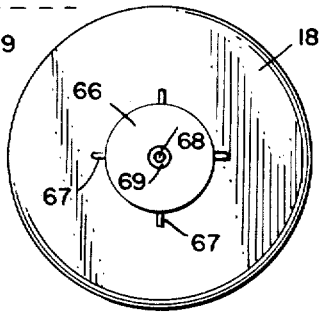
FIG. 7 is a plan view of a float support unit.
Figure 8:
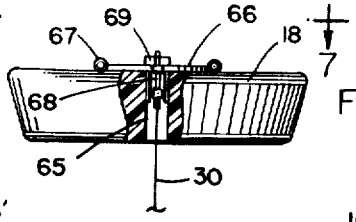
FIG. 8 is an elevational view, partially in section, of the float support unit.

FIGS. 7 and 8 show one of the support floats 18 in greater detail. The float can be fabricated in the same manner as float 10 and 11. A small opening 65, such as an opening of 2 to 3 inches in diameter, is all that is needed through the center of the case. Above this opening is provided a support plate 66 having mooring eyes 67 at the quadrants thereof. Through a central opening in the plate 16 the threaded upper end of an eyebolt 68 can be extended and secured with a nut 69. The high portion of the bolt extends downwardly within the opening 65, as shown in FIG. 8, and the support cable 30 has its upper end extending through and connected to the eye of the bolt.

INSTALLATION AND OPERATION

In the preferred installation of the modular system of this invention, the pump and float units within each module are aligned approximately with the direction of streamflow, that is, longitudinally rather than transversely in the stream. This is the arrangement shown in FIGS. 1 and 2, where the modules M are aligned with the direction of streamflow, and spaced sequentially along the channel C. Where the channel is of a size adapted for a single line of the modules, as shown, it is preferred to have the modules approximately centered in the stream. For example, with the embodiment shown, and where the spray patterns have a maximum diameter of about 40 feet, the modules can be installed as shown in FIG. 1 in streams of from 50 to 70 feet in width. For wide streams, clusters of modules can be used, as illustrated in FIG. 3.

Figure 3:
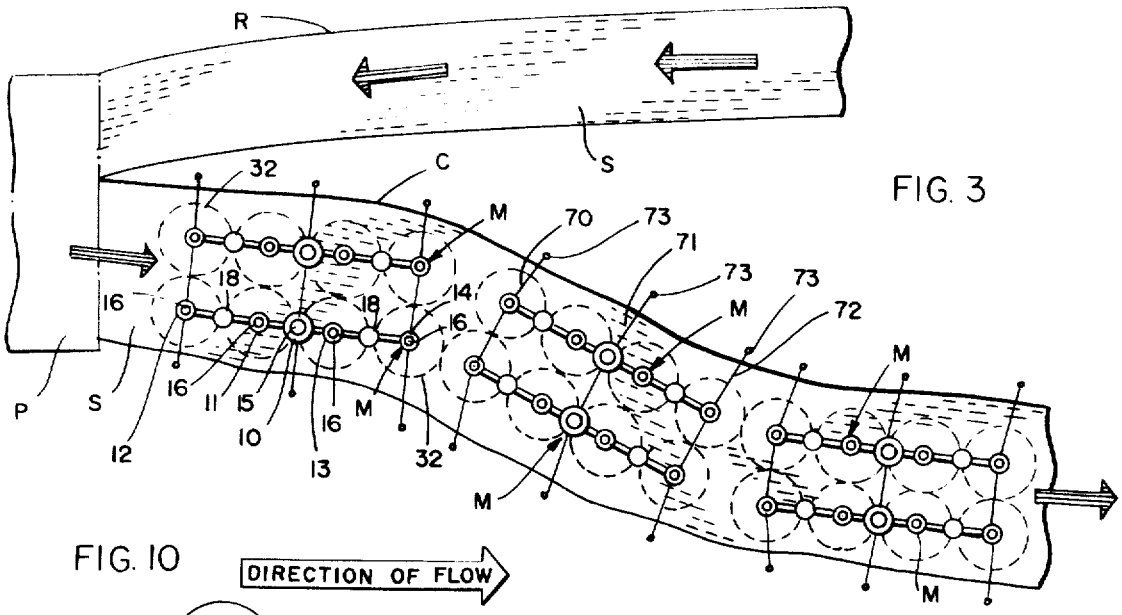
FIG. 3 is a diagrammatic plan view showing a typical installation of the modular system of this invention, the modules being arranged in transversely spaced clusters, and the clusters being arranged sequentially along the flow channel, and a return or fresh water intake channel being provided.

Looking now at FIG. 3, there is indicated a plant P, which provides the heat load source, the stream of heated water S being discharged into the channel C as indicated by the arrow. The embodiment shown illustrates either a loop-type or a once-through channel. The channel portion indicated at R can either be the return end of a loop channel or a water intake channel from a natural body of water. In a loop-type arrangement, the cooled water from the return channel R is supplied to the plant P for reuse. Where desired, a storage reservoir or pond can be provided between the discharge channel C and the return channel R. The modules M in FIG. 3 are of essentially the same construction as that previously described in respect to FIGS. 1 and 2. They include the central pump float 10 and pump 15, the spray floats 11 to 14 and the spray 16. In addition, there are provided the support floats 18. The spray patterns 32 are indicated by the dotted lines 32. These correspond with the base diameters of the sprays D as shown in FIG. 2A.

The mooring lines are indicated at 70, 71 and 72. It will be understood that these mooring lines can be in the form of steel cables which extend from embedded anchors on the shore, as indicated at 73, to the mooring eyes of the respective pump or spray units. The anchors can be formed by poured in place concrete posts with embedded rods terminating in attachment eyes as indicated in FIG. 1. Where two or more modules are clustered transversely, connecting cables can be extended between adjacent pump and spray units, as indicated in FIG. 3.

As will be noted in FIG. 3, the modules M are arranged in sequential clusters, each of the clusters including two generally side by side and transversely spaced modules. Preferably, as shown, the pump and spray units are approximately aligned with the direction of streamflow. With this arrangement, the pump units 15 within a given cluster, all take in water at approximately the same temperature and all of the spray units 16 are spraying water at approximately the same temperature. As will be appreciated, the maximum cooling range is obtained when the sprays are operating on the highest temperature water available. By using pairs of modules to form a cluster three of which are shown in FIG. 3 a stream width of 80 to 100 feet can be covered. Since the pump units are transversely spaced, the full stream width is covered, and channeling is minimized. It will be understood that for most installations many more clusters, or sequences of individual modules, will be employed than is indicated in FIG. 1 or 3. An extended series of from 10 to 200 sequences of individual modules, or sequences of clusters of modules, may be required to obtain the desired degree of cooling.

In FIG. 2B, there is illustrated a typical thermoprofile. The data shown is qualitative, and does not represent actual module requirements which depend on engineering calculations utilizing water rates and temperatures, and desired temperature reduction under the special or design ambient condition as determined by wet bulb temperature, average wind speed, and an average barometric pressure. In general, however, the thermoprofile of FIG. 2B is illustrative. As there shown, water discharged at a temperature of about 100° F. can be progressively reduced in temperature by a sequence of from 1 to 20 modules of the kind described with respect to FIGS. 1 and 2. The limiting condition is the wet bulb temperature of the ambient air. One of the advantages of the module system of this invention, wherein the modules are standardized, and used in standard sequences and patterns, is that the engineering calculations are greatly facilitated. These can be performed by a programmed general purpose digital computer. It is therefore possible to predict with considerable exactness how much cooling can be obtained for a given equipment installation. By looking at FIG. 2 the importance of this can be appreciated. For example, by using five modules, the temperature of water might be reduced from 100° to 90° F., while more modules would be required to reduce the water temperature another 10°. It will be appreciated that additional modules can be added to an installation at a later time, as cooling requirements are increased, or as it is desired to reduce the temperature more. The point where added equipment cost represents a poor investment in relation to increased cooling effect can be readily evaluated with the system of this invention.

As previously stated, the modules are preferably designed to minimize the immediate recirculation of the sprayed water. In the embodiments of FIGS. 1 and 2, this is accomplished by locating the pump intakes beneath the overhang of the pump float.

Figure 10:
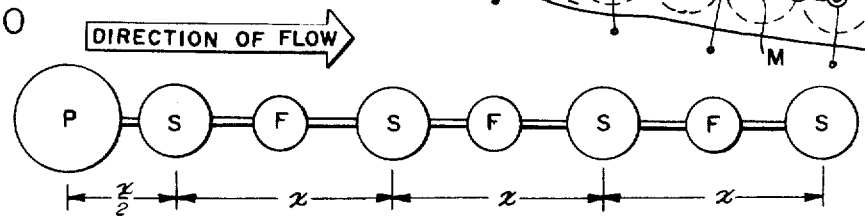
FIG. 10 is a diagrammatic view of an alternate arrangement of the pump spray and float units of the module.

The streamflow alignment described above can be achieved with variations of arrangement of the units within the module. For example, as shown in FIG. 10, the pump unit P can be the first upstream unit of the module, followed by four spray units S with intermediate float units F. The spacing can be similar to that previously described, the spray betwen the spacing units being represented by "x" while the spacing between the pump and first adjacent spray unit being represented by "x/2." Where the units are clustered in the same manner as FIG. 3, the transverse distance between the centers of the spray units will also be represented by "x."

While the modular arrangement of FIG. 10 can be utilized while achieving some of the advantages of the present invention, it is less desirable from the standpoint of equipment manufacturing costs. As will be noted, one more float unit F is required than in the embodiment of FIG. 2. Further, it is more difficult to balance the pump output, and pipe sections of reduced diameter would need to be used between each of the spray units. The achieving of uniform spray pressures and rates from each of the sprays is therefore possible with a module designed as shown in FIG. 10, but is much more readily obtainable with less cost with a module like that of FIG. 2.

Figure 11:
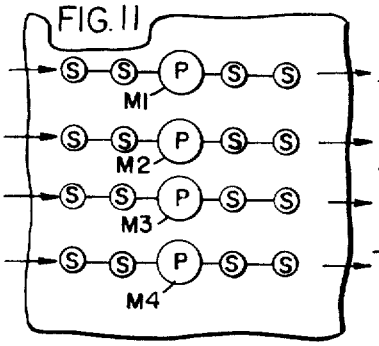
FIG. 11 is a diagrammatic view showing a preferred arrangement of a cluster of the modules.
Figure 12:
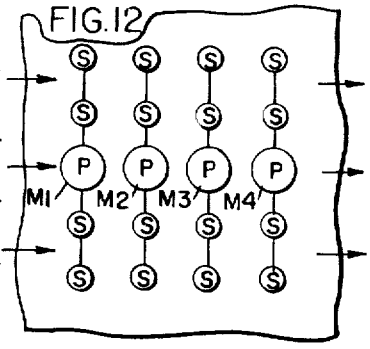
FIG. 12 is a diagrammatic view showing an alternative less desirable arrangement of a cluster of the modules.

FIGS. 11 and 12 illustrate a principle with respect to clustering of the modules. In these figures, the direction of streamflow is indicated by the arrows. In FIG. 11, four modules, M1, M2, M3, and M4 are arranged side by side and transversely spaced, the pump units P and the spray units S within each module being aligned with the direction of stream flow. In the embodiment of FIG. 12, the modules M1, M2, M3, and M4 are aligned transversely or crosswise with respect to the direction of streamflow. As will be observed, the spacing between the spray units of the cluster can be substantially the same, for example on 40 foot centers. With the cluster arrangement of FIG. 12, however, there are certain disadvantages. Instead of the pump units B drawing in water at the same temperature, as in the embodiment of FIG. 11, they will tend to draw in water of progressively lower temperature. Consequently, the pump unit M4 in the embodiment of FIG. 12 will be spraying water at a lower temperature than module M1. The sprays of module M4 will therefore produce less efficient evaporative cooling. A less apparent result is that the cluster arrangement of FIG. 11 tends to minimize wind and wet bulb effects, as compared with the arrangement of FIG. 12.

As indicated above, the transverse spacing of the pump units, as also shown in the cluster arrangement of FIG. 11, has the advantage of minimizing channeling, as compared with the arrangement of the pumps in the cluster in FIG. 12. Since all of the pumps in FIG. 12 are positioned along the center line of the stream, water flowing in the outer portions of the stream, that is, on each side of the pumps, will tend to channel around the pumps, and a longer length of channel and more sequences of the clusters will be required to obtain the same temperature reduction. On the other hand, with the arrangement of FIG. 11, the pumps will draw from the subsurface water across the full width of the stream, spraying the hottest water obtainable, and maximizing the efficiency of the evaporation cooling.

Figure 13:
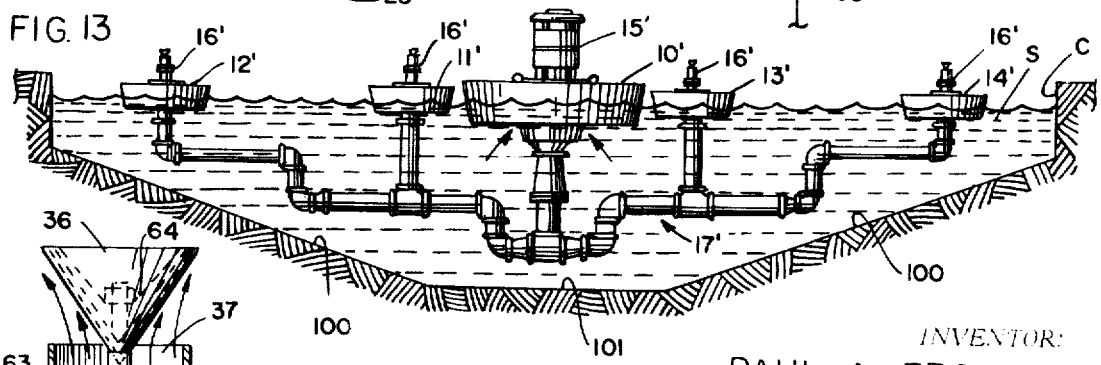
FIG. 13 is an elevational view of a transversely aligned modified module, the flow channel being shown in section.

Notwithstanding these objections to transverse alignment of the module, there may be instances in which such arrangements will be desirable. One application of a transverse alignment is illustrated in FIG. 13. As there shown, the channel C has sloping sides 100 and a deeper central portion 101. Where the sides of the channel slope inwardly and the center is the deepest portion, there will be less tendency for channeling, and also more depth for the pump unit, where all the pump units are positioned along the center of the channel. For convenience of reference, corresponding parts of the units of FIG. 13 have been given the same numbers as that of FIG. 2, except that the numbers have been primed. As will be noted, the pipe means 17' through a series of elbows provides horizontal runs at successively higher elevations towards the sides of the channel. This permits the float 10' to 14' to continue to fully support the pipe means 17'. Alternatively, however, a portion of the pipe system can be supported on the bottom or sloping sides of the channel.

Figure 14:
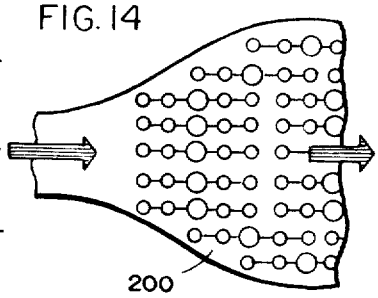
FIG. 14 is a diagrammatic view illustrating an arrangement of the modules in a flow channel of varying width.

A further advantage of the in line streamflow arrangement of the units of the modules is illustrated in FIG. 14. Where the width of the channel C varies, or where the channel opens out into an enlarged portion, as indicated at 200 in FIG. 14, the number of modules employed transversely can be readily increased, and the arrangement of the modules with respect to adjacent modules can be staggered to provide a substantially complete group of evenly spaced spray units across the stream. In the illustration given, the small circles represent spray units and the large circles the pump unit. These are modules of the same type as shown in FIG. 2, including a central spray unit with two upstream and two downstream spray units. At the entrance to the pond or stream enlargement 200, five of the modules are clustered transversely. Starting at the transverse line of the pump units of the first group of modules, the two further modules are added transversely, the first spray units being positioned opposite the pump unit. Further downstream, adjacent the pump units of the added modules, two additional modules are added, making a total of 9 modules across the stream. As will be apparent, these variations are possible while still maintaining the uniform spacing from spray to spray. The most efficient pattern for the sprays can therefore be maintained, and at the same time, sufficient modules can be utilized to draw water from the full stream width, thereby avoiding channeling.

Figure 15:
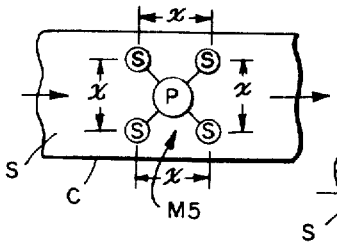
FIG. 15 is a diagrammatic view illustrating an X-shaped module in a flow channel.

In FIG. 15, there is shown an X-shaped module M5, which includes a central pump float and four outlying spray floats, as respectively indicated by the letters "P" and "S." In a typical embodiment, the spray floats are located at the corner of a square, as indicated by the dimensions "x." This provides a symmetrical module, which has the advantage of reducing the cost of the connecting piping, and permitting the elimination of support floats. However, for use in streams of varying widths and in transverse clusters, the X-module may be less flexible.

Figure 16:
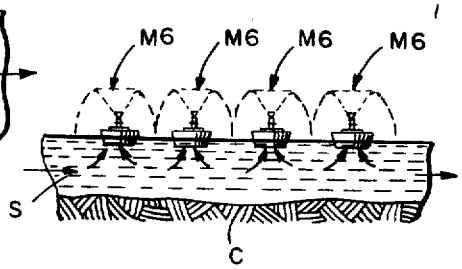
[FIG. 16 is an elevational view showing a sequence of combination pump and spray floats arranged in a flow channel.
Figure 17:
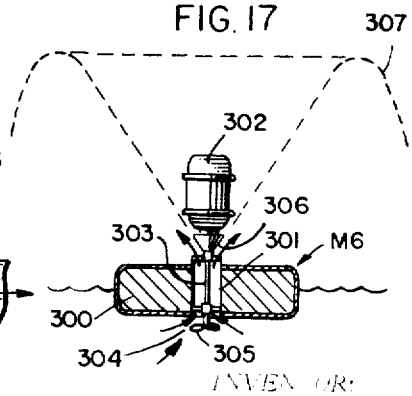
FIG. 17 is an enlarged elevational view of one of the combination pump and spray float units of FIG. 16.]

[Referring now to FIGS. 16 and 17, there is illustrated an embodiment of the sequential unit principle of this invention where the units are self-contained or combination pump and spray units. In FIG. 16 four of the units designated M6 are shown arranged in sequential equally spaced positions along the direction of the flow of stream S through the channel C. In FIG. 16, the unit M6 is shown in greater detail. It consists of a float designated generally as 300, having a tubular housing 301 extending through the center thereof. Mounted on top of the housing is a motor 302 which drives a rotor shaft 303. On the lower end of the rotor shaft within the flared water intake 304 is an impeller 305 mounted on the lower end of shaft 303. The impeller forces water upwardly through the housing 301 as indicated by the flow arrows, and the water is discharged vertically upwardly against the underside of the cone baffle 306. This discharge directs the water outwardly in a spray pattern as indicated by the dotted lines 307. As will be seen, an extended series of the units M6 can be positioned along the direction of streamflow to achieve a cooling thermoprofile of the type illustrated in FIG. 2B.]

From the foregoing discussion, it will be apparent that the modular system of this invention involved a novel method of cooling. The water to be cooled having a temperature above the ambient wet bulb temperature is caused to flow in a stream through an elongated earth surface channel in open contact with the atmosphere. A plurality, preferably an extended series of from 10 to 200, substantially identical pump and spray units are floated on the surface of the stream at fixed sequential locations therealong. Water is withdrawn from the stream from a subsurface level beneath each of the units into the pump intakes of the units. As represented in FIGS. 2, 13, and 16, the pump intakes of each of the units or modules are located in the upper portion of the stream. The withdrawn water is sprayed upwardly under pump pressure into the atmosphere above the units and permitted to fall back onto the surface of the flowing stream, thereby achieving sequential cooling. Where substantial portions of the sprayed water falls onto the surface area of the stream immediately above the points of withdrawal of the subsurface water, it is preferable to minimize direct recirculation of these sprayed portions by shielding the points of subsurface withdrawal from the sprayed surface areas.

DESIGN EXAMPLE

In this example, the essential design conditions are as follows: water is discharged from a power generating plant at approximately 103° F. at a rate of 560,000 gallons per minute. Under specified design conditions of 76° F. wet bulb and air wind speed of 5 m.p.h. it is desired to cool the water to 93.7° F. The equipment to be used are identical pump and spray modules like those shown in FIGS. 1 and 2. Each module has an overall length of 120 feet with the sprays arranged on 40 foot centers. The pump is driven by a 75 H.P. motor, and operates at a capacity of 10,000 gallons per minute. The sprays operate at substantially uniform pressure at individual capacities of 2,500 gallons per nozzle. The spray patterns have a height of approximately 20 feet above the surface of the water, and a diameter at the water level of approximately 40 feet. The channel has an average width of approximately 160 feet and an average depth of 7 feet. The desired cooling is achieved by the use of 84 of the modules arranged in clusters (or "passes") of four modules per cluster. Within the cluster or pass, the modules are aligned with the direction of the streamflow, and transversely side by side, as shown in FIG. 3. Twenty-one sequences of such clusters will be required. The thermal profile achieved will be similar to the one illustrated by FIG. 2B. The hot water being at the plant discharge temperature of 103° F. and the cool water after 21 passes (sequences of clusters) of 4 units per pass (cluster) will be reduced to substantially the design temperature of 93.7° F.

As compared with other types of cooling systems, such as packed cooling towers, involving either mechanical or natural draft, fixed pipe spray ponds or evaporative lakes and ponds, the modular system of this invention has many advantages. Reliable performance is possible at a close approach to wet bulb temperature, which is not true for fixed pipe spray ponds or evaporative lakes and ponds. Durability and years of trouble-free service are inherent in the system while wood-filled cooling towers and fixed pipe spray ponds are of limited life and require frequent servicing. With cooling towers, expensive water treating chemicals for the cooling equipment must be used in conventional cooling towers, but such chemicals are not required for the modular system of this invention, and in this respect it is like the fixed pipe spray ponds or evaporative lake ponds. The system eliminates fire hazards, which is not true of wood cooling towers. Still further advantages of the modular system of this invention are that it does not require expensive basins, foundations, piping and pumping systems as do cooling towers and spray ponds. In terms of performance, close control of the cold water temperature is possible, while with prior equipment, such close control could only be obtained with the relatively expensive mechanical draft cooling towers, and at increased operating cost. However, with mechanical draft cooling towers, performance does not remain at a high level over a long period of time because of degrading due to deterioration of components occurs. With the system of this invention, there is substantially no deterioration of components and high performance is obtainable for long periods of time. As contrasted with all other prior types of cooling systems, the system of this invention for the first time permits economic installations at existing plants that have once-through cooling to control thermal pollution, and the system can be expanded to future cooling demands without costly alterations.

It will be appreciated that cooling requirements will vary from day to day for an actual installation. Where the ambient temperature and humidity conditions are such that the desired amount of cooling can be achieved by operation of less than the full installed sequence of the modules, any number of the modules can be temporarily taken out of operation. This can be done by turning off the pump motor of each of the modules, or by turning off the electric power to batteries of the modules, if they are wired in this manner. For more elaborate automated type of installations, water sensing means can be provided downstream of the last of the modules, and can be connected through an automatic control panel, which will automatically turn off (or on) the number of spray modules to maintain the desired cooling temperature. As will be appreciated, this permits maximum saving in operating costs, the power requirements of the system being minimized in relation to actual spray operating requirements on a particular day.

I claim:

1. A modular floating water cooling system for reducing the temperature of water, such as heated water discharged from a plant into the upstream end of a water flow channel extending along the surface of the ground in open contact with the atmosphere, said water flowing as a continuous stream through said channel, comprising a plurality of identical water spray modules floating in said stream and anchored at sequential locations along the direction of streamflow of said channel, each of said modules including at least three separate float means, power-operated water pump means supported by one of said float means, at least two water spray means supported by others of said floats means, and pipe means extending from and connecting said pump means to each of said spray means, said pump means having water intake means in communication with the flowing water of said stream and outlet means directing said water under pressure into said pipe means for supply to said spray means, said spray means of each of said modules being operative to project sprays of water upwardly into the atmosphere above said stream for sequential cooling of the flowing water.

2. The modular system of claim 1 in which at least one of said water spray means in each of said modules is positioned downstream of the said pump means therein.

3. The modular system of claim 1 in which each of said modules contain four or six of said spray means.

4. The modular system of claim 1 in which each of said modules contain four of said spray means, two of said spray means in each of said modules being located upstream and two downstream of said pump means therein.

5. The modular system of claim 1 in which said spray means provide substantially identical spray patterns with respect to spray volume, height, and diameter.

6. The modular system of claim 1 in which the spray means adjacent to said one float means supporting said pump means provide spray patterns overlapping the said one float means, and in which said pump intake means is located below the central portion of said one float means which is disk-shaped and projects outwardly beyond said intake means to provide a shielding overhang therefor, whereby said pump means tends to draw its intake water from the hotter subsurface portions of said stream without appreciable immediate recirculation of the sprayed water.

7. The modular system of claim 1 in which said pipe means are rigid and are rigidly connected to said pump means and said water spray means, said pipe means being supported by said float means and spacing said spray means and the float means associated therewith at approximately equal distances apart and being effective to maintain said spacing, said pipe means being supported beneath said float means and above the bottom of said channel means.

8. The modular system of claim 1 in which said modules are arranged in sequences of individual modules, the pump means and the spray means for each module being aligned with the direction of stream flow.

9. The modular system of claim 1 wherein said modules are arranged in sequential clusters, each of said clusters including at least two generally side by side and transversely spaced-apart modules, the pump means and spray means for each module being aligned with the direction of streamflow.

10. The modular system of claim 9 in which the spray means within each of said clusters are located approximately equal distances apart, and in which said spray means provide substantially identical spray patterns with respect to spray volume, height, and diameter.

11. The modular system of claim 9 in which the pump means within each of said clusters are located on a transverse line generally perpendicular to the direction of streamflow.

12. The modular system of claim 9 in which each of said modules contains four of said spray means, and within each module two of said spray means are located upstream and two downstream with respect to said pump means therein.

13. A modular system for reducing the temperature of heated water discharged from a plant source into a water flow channel extending along the surface of the ground in open contact with the atmosphere, said water flowing as a continuous stream through said channel, comprising an extended series of identical water spray modules floating in said stream and anchored at sequential locations along the direction of streamflow, each of said modules including at least five separate disk-shaped float means arranged in a line along the direction of streamflow, power-operated water pump means supported centrally by the middle one of said float means, water spray means supported centrally by the two upstream and the two downstream of said float means with respect to said middle float means, and pipe means extending from and connecting said pump means to each of said spray means, said pump means having water intake means in communication with the flowing water of said stream and outlet means directing said water under pressure into said pipe means, said spray means of each of said modules being operative to project sprays of water upwardly into the atmosphere above said stream for sequential cooling of the sprayed water.

14. The modular system of claim 13 in which the spray means adjacent to said one float means supporting said pump means provide spray patterns overlapping the said one float means, and in which said pump intake means is located below the central portion said middle float means which projects outwardly therebeyond, whereby said pump means tends to draw its intake water from the hotter subsurface portions of said stream without appreciable immediate recirculation of the sprayed water.

15. The modular system of claim 13 in which said spray means provide substantially identical spray patterns with respect to spray volume, height, and diameter, and in which the spray means at least within each of said modules are located approximately equal distances apart.

16. The modular system of claim 13 wherein said modules are arranged in sequential substantially identical clusters, each of said clusters including at least two generally side by side and transversely spaced-apart modules, the pump means and spray means for each module being aligned with the direction of streamflow.

17. The modular system of claim 16 in which the pump means within each of said clusters are located on a transverse line generally perpendicular to the direction of streamflow.

18. A modular system for reducing the temperature of heated water discharged from a plant source into a water flow channel extending along the surface of the ground in open contact with the atmosphere, said water flowing as a continuous stream through said channel, comprising a plurality of substantially identical clusters of water spray modules floating in said stream and anchored at sequential locations along the direction of streamflow, each of said modules including at least five separate float means arranged in a line along the direction of streamflow, power-operated water pump means supported by the central one of said float means of each module, water spray means supported by the two upstream and the two downstream of said float means with respect to said central float means of each module, and pipe means extending from and connecting said pump means of each module to each of said spray means thereof, said pump means having water intake means in communication with the flowing water of said stream and outlet means directing said water under pressure into said pipe means, said spray means being operative to project sprays of water upwardly into the atmosphere above said stream, said clusters including at least two side-by-side and transversely spaced-apart ones of said modules, the pump means and spray means within each of said clusters being located approximately equal distances apart, and said spray means providing substantially identical spray patterns with respect to spray volume, height, and diameter.

19. The modular system of claim 18 in which said spray patterns from adjacent spray means to spray means are contiguous but not substantially overlapping, said pipe means being rigid and being effective to maintain the spacing of said spray means.

20. An evaporative cooling apparatus for reducing the temperature of a body of heated water, pump and spray unit means adapted to float in said body of water and including at least three separate disk-shaped float means, power-operated water pump means centrally supported by one of said float means, water spray means centrally supported by others of said float means, and pipe means extending from and connecting said pump means to each of said spray means, said pump means having water intake means for communication with the water of said body and outlet means directing said water under pressure into said pipe means, said spray means being operative to project sprays of water upwardly into the atmosphere above said body of water.

21. The pump and spray unit means of claim 20 in which the spray means adjacent said one float means supporting said pump means provides spray patterns overlapping said float means, and in which said pump intake means is located below the central portion of said one float means which projects outwardly therebeyond, whereby said float means tends to draw its intake water from the hotter subsurface portions of said body of water without appreciable immediate recirculation of the sprayed water.

22. The pump and spray unit means of claim 20 in which said pipe means are rigid and are rigidly connected to said pump means and said water spray means, said pipe means being supported by said float means and spacing said spray means and the float means associated therewith at approximately equal distances apart and being effective to maintain said spacing.

23. The pump and spray unit means of claim 22 in which said spray means provides substantially identical spray patterns with respect to spray volume, height, and diameter.

24. A water-cooling system in a stream of water and including a pump-motor float assembly having a water inlet and a driven propeller within a pump housing, multiple spray floats having upwardly directed nozzles, conduit means connecting said pump housing with said nozzles, and means anchoring said floats within the stream.

25. A modular floating water cooling system for reducing the temperature of water, such as heated water discharged from a plant into the upstream end of a water flow channel in open contact with the atmosphere, said water flowing as a continuous stream through said channel, comprising a plurality of water spray modules floating in said stream and anchored at sequential locations along the direction of streamflow thereof, each of said modules including float means, power-operated water pump means supported by said float means, at least two water spray means supported by said float means, and pipe means extending from and connecting said pump means to each of said spray means, said pump means having water intake means in communication with the flowing water of said stream and outlet means directing said water under pressure into said pipe means for supply to said spray means, said spray means of each of said modules being operative to project sprays of water upwardly into the atmosphere above said stream for sequential cooling of the flowing water.

26. The method of progressively cooling large volumes of heated water to a desired minimum temperature reduction under specified design conditions comprising discharging the heated water from a source thereof, such as a power generating or industrial plant, into an upstream end of an elongated earth surface channel in open contact with the atmosphere, said channel providing said stream with essentially parallel channel flow, continuously flowing said water through said channel from said upstream end to a downstream point at which cooled water is required, floating on the surface of said parallel flowing stream an extended series of combination pump and spray units *while maintaining said parallel flow of said stream,* said units being positioned at generally-fixed longitudinally-spaced locations in said stream *and each unit providing a central float-supported pump and a plurality of separately float-supported sprays,* withdrawing water from said flowing stream *below said pump floats* into the pumps of said units, and spraying the withdrawn water from the sprays of said units in patterned sprays providing evaporative cooling by contact with the atmosphere, said *patterned* sprays rising to an elevation above the surface of said stream and substantially falling back onto the surface thereof, said withdrawing [sand] *and* spraying progressively reducing the temperature of the water of said stream in the direction of stream flow in proportion to the number of pump and spray units in said longitudinal sequence.

27. The method of claim 26 in which said longitudinal sequence includes at least 10 of said combination pump and spray units, and in which the water supplied to the pumps of said units is withdrawn from the upper portion of said stream.

28. The method of claim 26 in which said units are arranged in both flow-direction sequences and cross-stream clusters.

29. The method of claim 26 wherein portions of the sprayed water fall onto surface areas of said stream immediately above the points at which water is withdrawn into said pumps, and wherein said points of water withdrawal are shielded from said surface areas to block direct recirculation of said sprayed portions.

30. The method of claim 26 in which the pumps of said units are supported on disk-shaped floats having diameters of about 8 to 20 feet and thicknesses of about 1 to 3 feet, and said water for spraying by said units is withdrawn from said stream at points immediately beneath said pump floats and with respect to which said pump floats extend laterally outward.

31. The method of claim 26 wherein the number of said units having the pumps and sprays thereof in operation at a given time is selectively varied in relation to changes in ambient temperature and humidity conditions to obtain said desired minimum temperature reduction.

*32. The method of claim 26 wherein at least one spray in each unit is positioned upstream and at least one downstream with respect to the pump float thereof, and the pump and sprays of each unit are aligned with the direction of stream flow.*

*33. The method of claim 26 wherein said units with respect to the pumps and sprays therein are aligned with the direction of stream flow, and said units are arranged in both flow-direction sequences and cross-stream clusters.*

*34. The method of claim 26 wherein said units each contain two sprays positioned upstream and two sprays positioned downstream with respect to the pump float thereof.*

*35. The method of progressively cooling large volumes of heated water to a desired minimum temperature reduction under specified design conditions, comprising discharging the heated water from a source thereof, such as a power generating or industrial plant, into an upstream end of an elongated earth surface channel in open contact with the atmosphere, said channel providing said stream with essentially parallel channel flow, continuously flowing said water through said channel from said upstream end to a downstream point at which cooled water is required, floating on the surface of said parallel flowing*

*stream an extended series of combination pump and spray units while maintaining said parallel flow of said stream, said units being positioned in a flow direction sequence at generally-fixed longitudinally-spaced locations in said stream, said units being also arranged in cross-stream clusters, each unit providing a central float-supported pump and a plurality of separately float-supported sprays, at least one of the said sprays of each unit being positioned upstream and at least one downstream with respect to the pump float thereof and the pump and sprays of each unit being aligned with the direction of stream flow, withdrawing water from the upper portion of said flowing stream beneath said pump floats into the pumps of said units, and spraying the withdrawn water from the sprays of said units in patterned sprays providing evaporative cooling by contact with the atmosphere, said patterned sprays rising to an elevation above the surface of said stream and substantially falling back onto the surface thereof, said withdrawing and spraying progressively reducing the temperature of the water of said stream in the direction of stream flow in proportion to the number of pump and spray units in said longitudinal sequence.*

*36. The method of claim 35 wherein said units each contain four sprays, two of said four sprays being positioned upstream and two downstream with respect to the pump float of each unit, and the said spray patterns of the*

*sprays in each of said units being contiguous but not substantially overlapping.*

*37. The method of claim 36 wherein parts of the water from sprays adjacent the pump floats falls onto said pump floats so that said pump floats thereby block the direct recirculation of such water.*

References Cited

The following references, cited by the Examiner, are of record in the patented file of this patent or the original patent.

UNITED STATES PATENTS

| | | | |
|---|---|---|---|
| 1,233,119 | 7/1917 | Parker | 261—120 U X |
| 3,235,877 | 2/1966 | Grob | 261—120 U X |
| 3,320,160 | 5/1967 | Welles, Jr. et al. | 261—93 X |
| 3,416,729 | 12/1968 | Ravitts et al. | 261—120 X |
| 3,521,864 | 7/1970 | Welles, Jr. | 261—120 X |

M. HENSON WOOD, Jr., Primary Examiner

M. MAR, Assistant Examiner

U.S. Cl. X.R.

239—13, 23, 550; 261—93, 120; 417—61